United States Patent
Tyler et al.

(10) Patent No.: US 12,001,544 B2
(45) Date of Patent: Jun. 4, 2024

(54) SYSTEMS AND METHODS FOR ATTACKS, COUNTERMEASURES, ARCHIVING, DATA LEAK PREVENTION, AND OTHER NOVEL SERVICES FOR ACTIVE MESSAGES

(71) Applicant: Mimecast Services Ltd., London (GB)

(72) Inventors: Simon Paul Tyler, Wiltshire (GB); Nathaniel S. Borenstein, Greenbush, MI (US); Jackie Anne Maylor, Wiltshire (GB); Carlos da Silva, Vila Nova de Gaia (PT); Kevin Slote, Atlanta, GA (US); Herbert L. Roitblat, Ventura, CA (US); Florian P. Buetow, London (GB); Chris Bamford, London (GB)

(73) Assignee: Mimecast Services Ltd., London (GB)

( * ) Notice: Subject to any disclaimer, the term of this patent is extended or adjusted under 35 U.S.C. 154(b) by 305 days.

(21) Appl. No.: 17/554,788

(22) Filed: Dec. 17, 2021

(65) Prior Publication Data

US 2022/0197997 A1     Jun. 23, 2022

Related U.S. Application Data

(60) Provisional application No. 63/174,842, filed on Apr. 14, 2021, provisional application No. 63/126,647, filed on Dec. 17, 2020.

(51) Int. Cl.
*G06F 21/00*     (2013.01)
*G06F 21/53*     (2013.01)
(Continued)

(52) U.S. Cl.
CPC ............ *G06F 21/53* (2013.01); *H04L 51/214* (2022.05); *H04L 51/23* (2022.05); *G06F 2221/033* (2013.01)

(58) Field of Classification Search
CPC . G06F 21/53; G06F 2221/033; H04L 51/214; H04L 51/23; H04L 51/18;
(Continued)

(56) References Cited

U.S. PATENT DOCUMENTS 5,910,987 A      6/1999   Ginter et al.
6,965,968 B1    11/2005   Touboul
(Continued)

FOREIGN PATENT DOCUMENTS

GB     2611495 B      10/2023
WO     00/64118 A2    10/2000
(Continued)

OTHER PUBLICATIONS

[Author Unknown] "Get Started with Actionable Messages via Email," Outlook Developer, Microsoft Docs, Aug. 1, 2019, 7 pages.
(Continued)

*Primary Examiner* — Ghazal B Shehni
(74) *Attorney, Agent, or Firm* — Nutter McClennen & Fish LLP

(57) ABSTRACT

Systems and methods for attacks, countermeasures, archiving, data leak prevention, and other novel services relating to active messages are disclosed. Among other things, a system can replace active content with static content in a message, can replace static content with active content in a message, and can use active messaging to provide enhanced on-hold message functions.

18 Claims, 4 Drawing Sheets

(51) Int. Cl.
*H04L 51/214* (2022.01)
*H04L 51/23* (2022.01)

(58) Field of Classification Search
CPC ............... H04L 63/0281; H04L 63/145; H04L 63/1466; H04L 51/063; H04L 63/1483
See application file for complete search history.

(56) References Cited

U.S. PATENT DOCUMENTS

| | | | |
|---|---|---|---|
| 11,163,898 | B2 | 11/2021 | Borenstein |
| 2005/0262208 | A1 | 11/2005 | Haviv et al. |
| 2005/0268101 | A1* | 12/2005 | Gasparini ............. H04L 9/3247 |
| | | | 713/176 |
| 2006/0101334 | A1 | 5/2006 | Liao et al. |
| 2007/0044149 | A1 | 2/2007 | Xavier et al. |
| 2009/0165138 | A1 | 6/2009 | Stewart et al. |
| 2011/0196933 | A1* | 8/2011 | Jackson ................ H04L 51/066 |
| | | | 709/206 |
| 2016/0182532 | A1 | 6/2016 | Jones |
| 2016/0315889 | A1* | 10/2016 | Uraizee ................ H04L 51/216 |
| 2017/0063751 | A1* | 3/2017 | Korboulewsky-Braustein ............ |
| | | | H04L 51/18 |
| 2018/0013725 | A1 | 1/2018 | Kagarlitsky |
| 2019/0020687 | A1* | 1/2019 | Noon ..................... G06F 21/604 |
| 2020/0167416 | A1* | 5/2020 | Grajewski ............... H04L 51/10 |
| 2020/0351300 | A1 | 11/2020 | Kaidi |

FOREIGN PATENT DOCUMENTS

| | | |
|---|---|---|
| WO | 2013/056032 A2 | 4/2013 |
| WO | 2015/038518 A1 | 3/2015 |
| WO | 2018/213457 A1 | 11/2018 |
| WO | 2019/194411 A1 | 10/2019 |
| WO | 2022/133241 A2 | 6/2022 |

OTHER PUBLICATIONS

[Author Unknown] "The 1991 Girl Scout Cookie Active Email," Guppylake.com, Dec. 10, 2020, 2 pages.
[Author Unknown] "Use AMP to send interactive, dynamic emails," retrieved from the internet on Dec. 21, 2023 at: https://amp.dev/about/email, 6 pages.
[Author Unknown] "What are Actionable Messages in Office 365?", Outlook Developer, Microsoft Docs, Aug. 1, 2019, 11 pages.
Borenstein, N. "Computational Mail as Network Infrastructure for Computer-Supported Cooperative Work," CSCW, 1992 (10 pages).
Borenstein, N., "Email with a Mind of its Own: The Safe-Tcl Language for Enabled Mail," First Virtual Holdings, 1994 (14 pages).
Coldenwey, D., "AMP for Email is a Terrible Idea," TechCrunch, retrieved from the internet on Dec. 21, 2023 at: https://techcrunch.com/2018/02/13/amp-for-email-is-a-terrible-idea/, 16 pages.
Das, A., "Inside Actionable Messages in Outlook," Netwoven, Dec. 10, 2020, 10 pages.
Gilmore, L., "Embracing Microsoft Actionable Messages for online customers," Editor at Sage, Sage Developer Blog, Jul. 24, 2019, 7 pages.
International Search Report and Written Opinion for International Application No. PCT/US2021/064075, mailed Jun. 30, 2022 (19 pages).
Lardinois, F., "Google makes emails more dynamic with AMP for Email," TechCrunch, retrieved from the internet at https://techcrunch.com/2019/03/26/google-makes-emails-more-dynamic-with-amp-for-email/, 13 pages.
Lewis, P., "A Technology for the Virtual Marketplace," New York Times, Sep. 18, 1996, 4 pages.
Oram, J., "What's the Latest with AMP and How Can I Use it for Email," Email on Acid, retrieved from the internet on Dec. 21, 2023 at https://www.emailonacid.com/blog/article/industry-news/whats-the-latest-with-amp-and-how-can-i-use-it-for-email/, 13 pages.
Tracey, M.C., et al., Guidelines on Electronic Mail Security, Recommendations of the National Institute of Standards and Technology, National Institute of Standards and Technology (NIST), Technology Administration, U.S. Department of Commerce, Special Publication 800-45, Version 2, retrieved from the Internet: <https://nvlpubs.nist.gov/nistpubs/Legacy/SP/nistspcialpubliation800-45ver2.pdf//>, retrieved on Dec. 31, 2007 (139 Pages).
UK Intellectual Property Office, Search Report for Application No. GB2300535.8 dated Feb. 10, 2023, 5 pages.
Vrountas, T., "What is AMP for Email & What Should You Know Before Trying It?", retrieved from the internet on Dec. 21, 2023 at: https://instapage.com/blog/amp-for-email, 22 pages.

\* cited by examiner

Dear Credulous Fool,

I am writing to tell you that if you simply click on this link: ← 401 i-swear-this-is-a-harmless-link ← 402

You will be showered with untold riches. Also, as if that weren't enough, I'm enclosing a file with my secret recipe for egg salad:

← 403

Yours truly,

The King of Nigeria

SYSTEMS AND METHODS FOR ATTACKS, COUNTERMEASURES, ARCHIVING, DATA LEAK PREVENTION, AND OTHER NOVEL SERVICES FOR ACTIVE MESSAGES

CROSS-REFERENCE TO RELATED APPLICATION(S)

This patent application claims the benefit of U.S. Provisional Patent Application No. 63/126,647 entitled Systems and Methods for Attacks, Countermeasures, Archiving, Data Leak Prevention, and Other Novel Services for Active Messages filed Dec. 17, 2020 and U.S. Provisional Patent Application No. 63/174,842 entitled Systems and Methods for Attacks, Countermeasures, Archiving, Data Leak Prevention, and Other Novel Services for Active Messages filed Apr. 14, 2021, each of which is hereby incorporated herein by reference in its entirety.

FIELD OF THE INVENTION

The invention generally relates to attacks, countermeasures, archiving, data leak prevention, and other novel services for active messages.

BACKGROUND OF THE INVENTION

Active messages are email or other messages that contain not just fixed content like text, pictures, video, or links, but dynamic content, such as a computer program that runs when the user reads the message, or an interactive form that can trigger actions on other systems via http links. The first system for active messages was built in the late 1970's. Two prominent active message systems were built by inventor Nathaniel Borenstein in the late 80's and early 90's. Aspects of such systems are described in the following references:

Borenstein, Nathaniel. (1994). EMail With A Mind of Its Own: The Safe-Tcl Language for Enabled Mail. 389-402.

Borenstein, N. "Computational mail as network infrastructure for computer-supported cooperative work." CSCW '92 (1992).

A 1991 implementation of such active messaging is described in http://guppylake.com/girlscouts1991/index.html.

More recently, two systems are emerging as the first likely candidates to make active messages a widely used phenomenon: Google's Accelerated Mobile Pages for Email (AMP) and Microsoft's "Actionable Messages" (AM). AMP allows senders to include rich engaging active content within emails. AMP is a relatively new email format that allows senders to include forms (including forms that submit to external services), image carousels, tabs, and other dynamic or external form content and active content. Each time a recipient interacts with an active email, the content and/or form inputs observed may be completely different. These technologies allow a recipient to, for example, book a plane ticket, fill out a questionnaire, respond to a comment, or browse a store's inventory from within the recipient's email client. Generally speaking, AMP is aimed at marketing while AM is largely aimed at business process actions/workflows internal to a company but could also be used for workflow that spans multiple organizations. Of course, nothing restricts active messages to such intended uses.

The following is some background information regarding AM:

https://docs.microsoft.com/en-us/outlook/actionable-messages/o
https://docs.microsoft.com/en-us/outlook/actionable-messages/send-via-email
https://www.netwoven.com/2020/03/05/inside-actionable-messages-in-outlook/o
https://medium.com/sagefuturemakers/embracing-microsoft-actionable-messages-for-online-customers-324bb0abb4d.

The following is some background information regarding AMP:

https://amp.dev/about/email/o
https://instapage.com/blog/amp-for-email
https://www.emailonacid.com/blog/article/industry-news/whats-the-latest-with-amp-and-how-can-i-use-it-for-email/o
https://techcrunch.com/2019/03/26/google-makes-emails-more-dynamic-with-amp-for-email
https://techcrunch.com/2018/02/13/amp-for-email-is-a-terrible-idea/.

The following article discusses the concept of interactive banner advertisements by web or email: https://www.nytimes.com/1996/09/18/business/a-technology-for-the-virtual-marketplace.html.

SUMMARY OF VARIOUS EMBODIMENTS

In accordance with one embodiment, a system, method, and computer program product can include a processor coupled to a memory containing instructions executable by the processor to cause the system to receive an email message sent from a sender to a recipient containing active message content; execute the active message content on behalf of the recipient; convert the executed active message content to static content; and forward the email message to the recipient with the active message content replaced by the static content.

In various alternative embodiments, executing the active message content on behalf of the recipient may include interacting with the active message content as the recipient so that the active message content is customized for the recipient as if the recipient had interacted with the active message content themselves. If the email message is sent from the sender to a plurality of recipients, then, for each recipient, the system could execute the active message content on behalf of the recipient, convert the executed active message content for recipient to static content for the recipient, and forward the email message to the recipient with the active message content replaced by the static content for the recipient, such that, for example, the system could deliver different static content to different recipients by virtue of different interactions with the active message content. The system could include in the forwarded email message a user option to selectively re-enable at least some of the active content, in which case the system could re-enable only active content deemed by the system to be safe. Upon user interaction with such re-enabled active content by the recipient, the system could re-execute the active message content on behalf of the recipient, convert the re-executed active message content for recipient to static content for the recipient, and deliver the static content associated with the re-executed active message content to the recipient.

In accordance with another embodiment, a system, method, and computer program product can include a processor coupled to a memory containing instructions executable by the processor to cause the system to receive an email message sent from a sender to a recipient containing static message content; convert the static message content to active content; and forward the email message to the recipient with the static message content replaced by the active content.

In various alternative embodiments, the system could deliver different active content to different recipients. The system also could use the active content to push updates or information to the user such as security information about the message or elements of the message.

In accordance with another embodiment, a system, method, and computer program product can include a processor coupled to a memory containing instructions executable by the processor to cause the system to transmit an active message to a recipient including a list of on-hold messages for the recipient, the active message including at least one of (a) a user interface control allowing the recipient to perform an action on all of the on-hold messages or (b) click buttons allowing the recipient to perform actions on the listed on-hold messages.

In accordance with another embodiment, a system, method, and computer program product can include a processor coupled to a memory containing instructions executable by the processor to cause the system to transmit an active message to a recipient including a list of on-hold messages for the recipient; dynamically updating the list to remove any on-hold messages processed by the recipient; and dynamically updating the list to add any new on-hold messages for the recipient.

Additional embodiments may be disclosed and claimed.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

It should be noted that the foregoing figures and the elements depicted therein are not necessarily drawn to consistent scale or to any scale. Unless the context otherwise suggests, like elements are indicated by like numerals. The drawings are primarily for illustrative purposes and are not intended to limit the scope of the inventive subject matter described herein.

DESCRIPTION OF ILLUSTRATIVE EMBODIMENTS

Exemplary embodiments described herein provide various systems and methods for attacks, countermeasures, archiving, data leak prevention, and other novel services relating to active messages (which also may be referred as dynamic messages or dynamic emails). It should be noted that AMP and AM are used herein as examples of active messages in the context of active emails, although embodiments of the present invention are not limited to AMP or AM and instead can be applied to active messages in other types of active messaging systems more generally (e.g., SMS, MMS, iMessage, WhatsApp, etc.).

As used in this description and the accompanying claims, a "set" includes one or more members.

Figure 1:
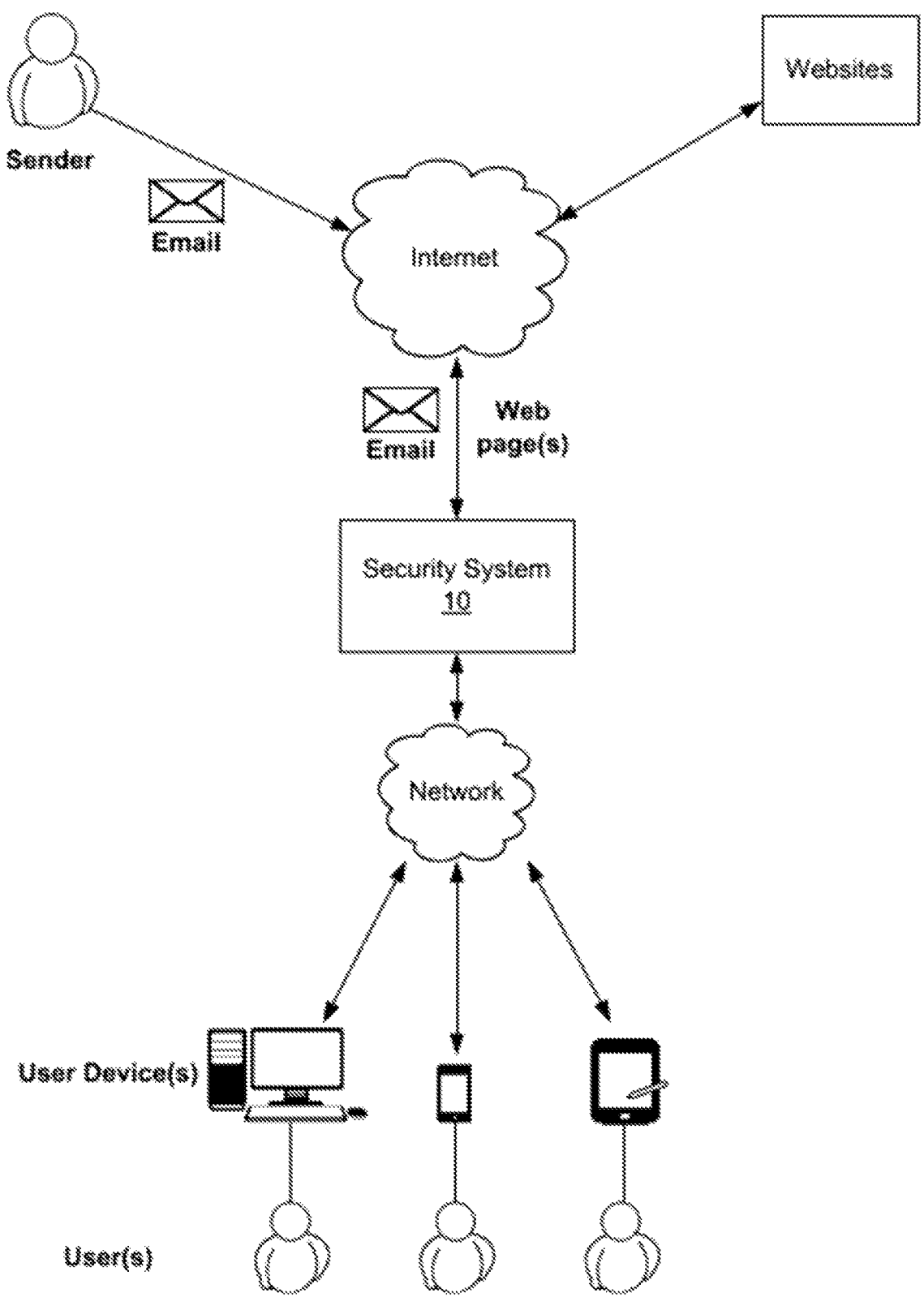
FIG. 1 is a schematic block diagram illustrating an email and security system consistent with the present disclosure.

FIG. 1 is a schematic block diagram illustrating a security system consistent with various embodiments disclosed herein. The security system 10 is configured to assist a user in avoiding potential security breaches when interacting with their computing device, particularly when the user is browsing a web page, emails, documents, or other forms of content displayed on a user interface of the device. Such forms of content (i.e., web pages, emails, documents, etc.) may include clickable objects (e.g., a hyperlink, icon, attachment, or other representation of an information resource) and may include active messages and active message content such as described herein.

Figure 2:
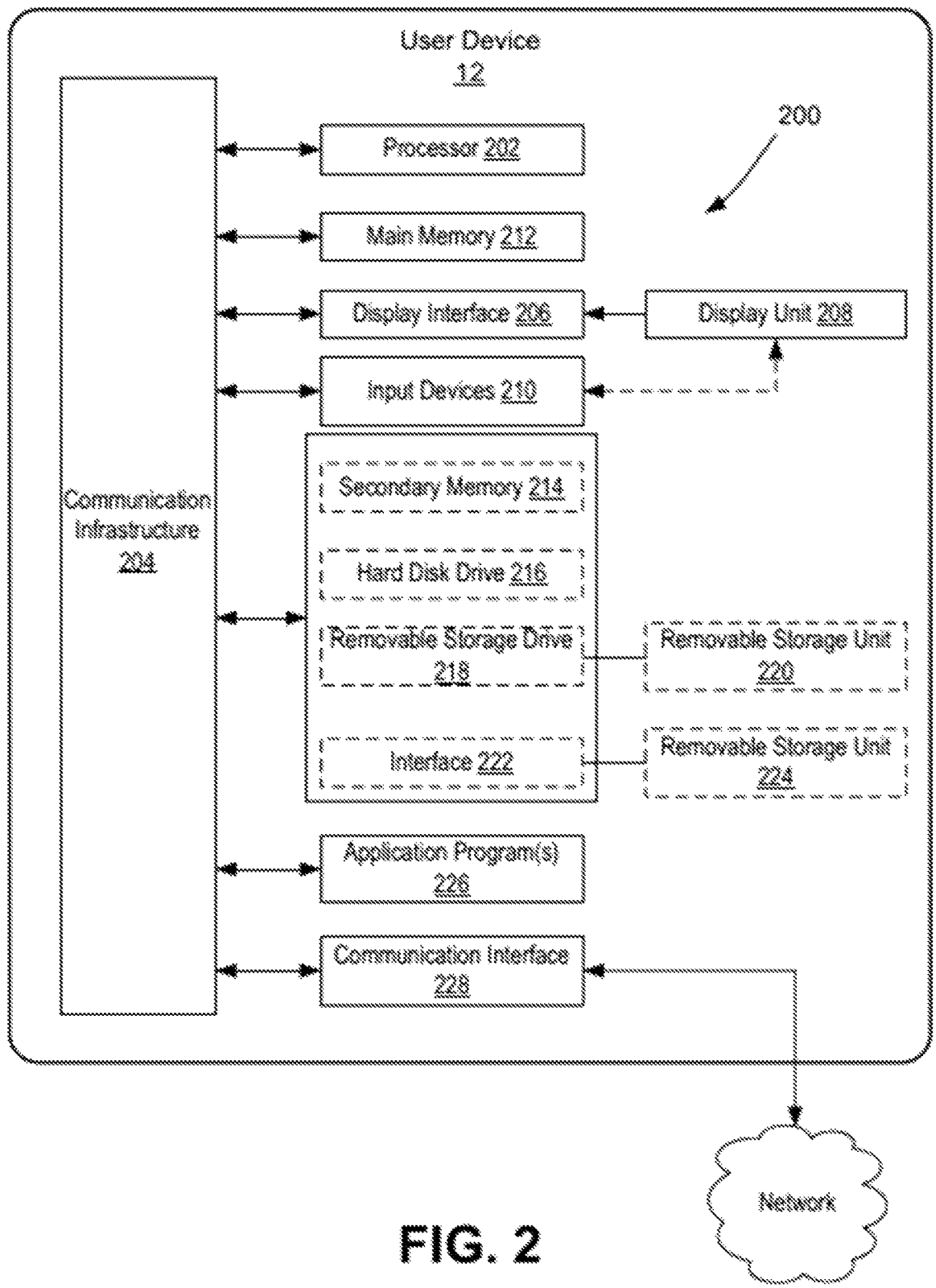
FIG. 2 is a block diagram illustrating at least one embodiment of a user device.

FIG. 2 is a block diagram illustrating at least one embodiment of a user device 12 for communicating with the security system 10 of the present disclosure. The user device 12 generally includes a computing system 200. As shown, the computing system 200 includes one or more processors, such as processor 202. Processor 202 is operably connected to communication infrastructure 204 (e.g., a communications bus, cross-over bar, or network). The processor 202 may be embodied as any type of processor capable of performing the functions described herein. For example, the processor may be embodied as a single or multi-core processor(s), digital signal processor, microcontroller, or other processor or processing/controlling circuit.

The computing system 200 further includes a display interface 206 that forwards graphics, text, sounds, and other data from communication infrastructure 204 (or from a frame buffer not shown) for display on display unit 208. The computing system further includes input devices 210. The input devices 210 may include one or more devices for interacting with the user device 12, such as a keypad, mouse, trackball, microphone, camera, as well as other input components, including motion sensors, and the like. In one embodiment, the display unit 208 may include a touch-sensitive display (also known as "touch screens" or "touchscreens"), in addition to, or as an alternative to, physical push-button keyboard or the like. The touch screen may generally display graphics and text, as well as provides a user interface (e.g., but not limited to graphical user interface (GUI)) through which a user may interact with the user device 12, such as accessing and interacting with applications executed on the device 12.

The computing system 200 further includes main memory 212, such as random access memory (RAM), and may also include secondary memory 214. The main memory 212 and secondary memory 214 may be embodied as any type of device or devices configured for short-term or long-term storage of data such as, for example, memory devices and circuits, memory cards, hard disk drives, solid-state drives, or other data storage devices. Similarly, the memory 212, 214 may be embodied as any type of volatile or non-volatile memory or data storage capable of performing the functions described herein.

In the illustrative embodiment, the user device 12 may maintain one or more application programs, databases, media and/or other information in the main and/or secondary memory 212, 214. The secondary memory 214 may include, for example, a hard disk drive 216 and/or removable storage drive 218, representing a floppy disk drive, a magnetic tape drive, an optical disk drive, etc. Removable storage drive 218 reads from and/or writes to removable storage unit 220 in any known manner. The removable storage unit 220 may represents a floppy disk, magnetic tape, optical disk, etc. which is read by and written to by removable storage drive

218. As will be appreciated, removable storage unit 220 includes a computer usable storage medium having stored therein computer software and/or data.

In alternative embodiments, the secondary memory 214 may include other similar devices for allowing computer programs or other instructions to be loaded into the computing system 200. Such devices may include, for example, a removable storage unit 224 and interface 222. Examples of such may include a program cartridge and cartridge interface (such as that found in video game devices), a removable memory chip (such as an erasable programmable read only memory (EPROM), or programmable read only memory (PROM)) and associated socket, and other removable storage units 224 and interfaces 222, which allow software and data to be transferred from removable storage unit 224 to the computing system 200.

The computing system 200 further includes one or more application programs 226 directly stored thereon. The application program(s) 226 may include any number of different software application programs, each configured to execute a specific task.

The computing system 200 further includes a communications interface 228. The communications interface 228 may be embodied as any communication circuit, device, or collection thereof, capable of enabling communications between the user device 12 external devices. The communications interface 228 may be configured to use any one or more communication technology and associated protocols, as described above, to effect such communication. For example, the communications interface 228 may be configured to communicate and exchange data with the security system 10, as well as web sites and further receive email messages from one or more senders via a wireless transmission protocol including, but not limited to, Bluetooth communication, infrared communication, near field communication (NFC), radio-frequency identification (RFID) communication, cellular network communication, the most recently published versions of IEEE 802.11 transmission protocol standards as of January 2019, and a combination thereof. Examples of communications interface 228 may include a modem, a network interface (such as an Ethernet card), a communications port, a Personal Computer Memory Card International Association (PCMCIA) slot and card, wireless communication circuitry, etc.

Computer programs (also referred to as computer control logic) may be stored in main memory 212 and/or secondary memory 214 or a local database on the user device 12. Computer programs may also be received via communications interface 228. Such computer programs, when executed, enable the computing system 200 to perform the features of the present invention, as discussed herein. In particular, the computer programs, including application programs 226, when executed, enable processor 202 to perform the features of the present invention. Accordingly, such computer programs represent controllers of computer system 200.

In one embodiment where the invention is implemented using software, the software may be stored in a computer program product and loaded into the computing system 200 using removable storage drive 218, hard drive 216 or communications interface 228. The control logic (software), when executed by processor 202, causes processor 202 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Figure 3:
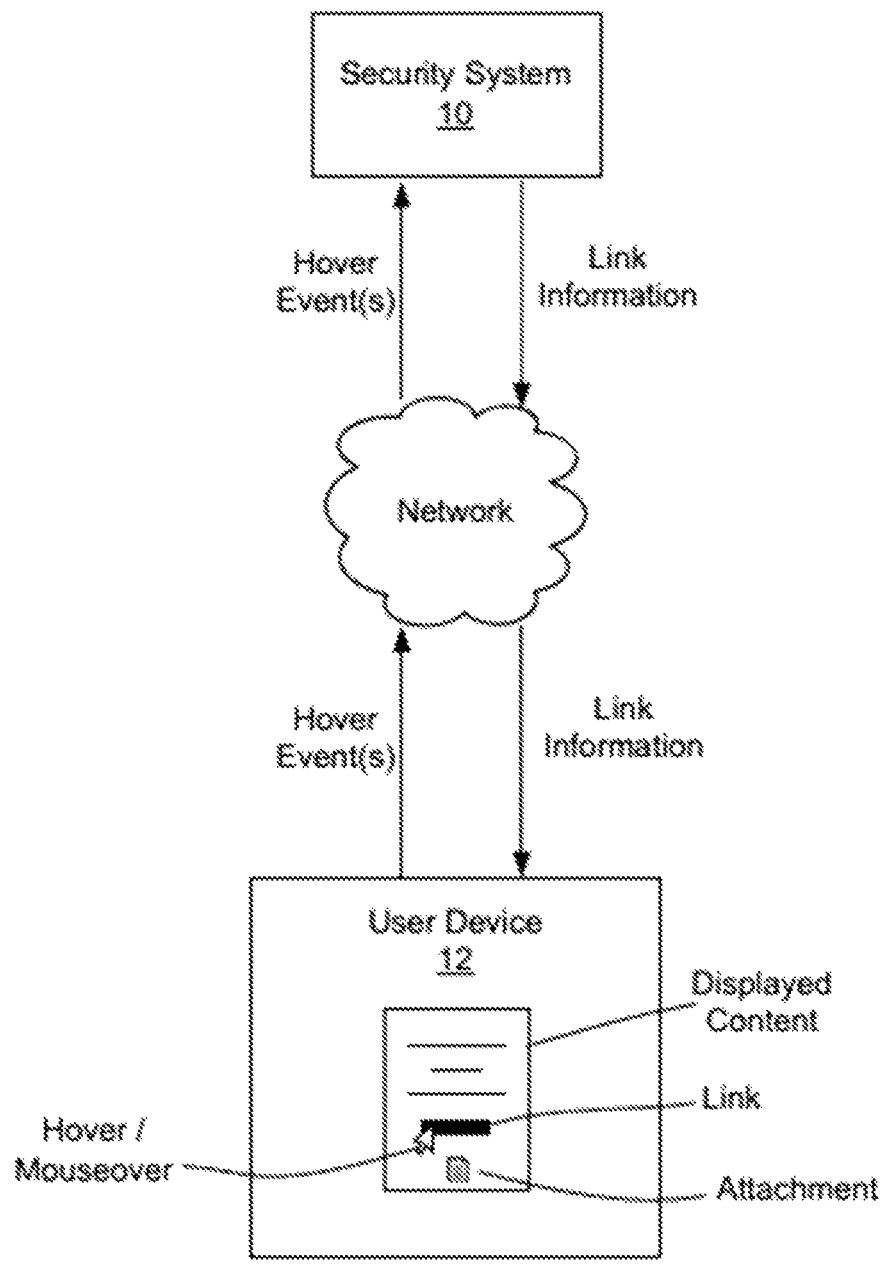
FIG. 3 is a block diagram illustrating communication between the user device and security system.

FIG. 3 is a block diagram illustrating communication between the user device 12 and security system 10. As illustrated, a user may be viewing a web page, email message, or other displayed content on the user device 12, which may include, for example, clicking on or hovering over a selectable object such as a link, an icon, an attachment, or other visual representation of an information resource.

Figure 4:
FIG. 4 illustrates an email message displayed on a user device.

FIG. 4 shows an email message 401 being displayed to a user. The message 401 includes a link 402, indicated by the text "I-swear-this-is-a-harmless-link." Of course, this text may be misleading as the actual link (URL) is not visible to the user. The message further includes a file attachment 403, which may or may not have any indicator of its contents, such as file name or type. As discussed herein, the message 401 may be an active message including active message content.

Active messages have the potential for serious security risks, including many new security vulnerabilities that were not addressed or in many cases not even conceivable in the early systems discussed in the background such as security vulnerabilities relating to HTTP and the web, phishing, impersonation, etc. And even though AMP and AM both introduce limitations based on a central actor (e.g., proxies such as those of Google or Microsoft) controlling who can send such messages and authentication requirements that allow recipients to only allow active messages from relatively trusted senders, enormous damage can result if other proxies (which can and do exist) or a SAAS service that is a trusted AMP sender is compromised. Thus, in some sense, no sender can be absolutely trusted. As such, a system for active messages needs to be designed very carefully to avoid security vulnerabilities. Additionally, because an active message may look and behave differently for different users (e.g., the same message sent to different users can present different information) or even each time they are read by a single user, they require new techniques to properly process, secure, validate, and archive them.

Active messages may be dynamic, meaning that they may be able to generate content dynamically (e.g., an active message with external content or an active message where all content is internal but not rendered) or take different actions each time they are run based on programmatic controls (either embedded in the message itself or the software that runs the active messages) that may, among other things, access content served externally to the message. Such dynamic content can include, without limitation, text, images, URLs, and even complete HTML sections. Local data and external data may be able to interact. But the dynamic aspect also includes the fact that the message might behave differently based on, for example, the time of day, user name, or anything else that the program can interrogate at run time. An active message can be made to perform any of a wide variety of insidious behaviors. For but one example, an active message could construct data for rendering in a manner in which the data itself cannot be readily detected (e.g., algorithmically constructing a person's name for rendering, such as from individual letters, in order to evade a name check). Two or more people receiving the same message could see very different things. These dynamic messages can also change as a consequence of how the recipient interacts with them. The dynamic properties of active messages can affect compliance monitoring and legally required supervision (for example, of broker-dealer communications). Actors could exploit these technologies to conceal evidence of wrongdoing. For example, a sneaky broker dealer could structure a message that presents one message to its intended recipient and another message to surveillance/supervision software and analysts. There may be no good way to determine the actual content of the email for the intended recipient because it is not contained in the email but is retrieved dynamically. Thus, it may be difficult to determine what the recipient actually saw, and there may be no definitive content to preserve. If there is no definitive representation of these messages, then their evidentiary value may be compromised. Overall, the inventors expect that bad actors will devise new and creative ways to use active messages for a virtually unlimited number of nefarious purposes and even envision that well-intentioned active messages could cause serious problems in unexpected ways.

Without limitation, the following is a list of some ways in which the inventors contemplate the use and handling of active messages relating to potential attacks, countermeasures, archiving, and other services such as by the security system 10, in accordance with various exemplary embodiments:

1. Link Rewrite: Similar to rewriting a link in a message, the system could rewrite the active content so that the system can, for example, serve back static content, record content via a proxy, record user interactions with the active content, rewrite external content links or addresses (e.g., to pass security checks), check and/or block user form submissions, etc. Unlike typical links, however, the system here generally needs to associate the rewritten active content to the message. This type of mechanism can be used by many of the items listed below.

2 Tracking/Privacy: Active messages can be used to perform functions such as detecting and tracking usage and interactions. For example, active message could be used to track how long a message was on the recipient's screen. It should be noted that this could be much more intrusive than current tracking in emails, e.g., imagine a user interacting with an active email and the remote sender knows that the user is interacting, knows the content of those interactions, and knows how long those interactions are ongoing, and can serve back content based on all this and previous interactions. Thus, for example, a bad actor could be monitoring the user's interactions in real-time and could control changes to the dynamic content presented to the user (e.g., by manipulating external data on a server from which content is served for rendering to the user).

3 Link Security: The system could add active content to a message prior to delivery to the recipient, e.g., active content that sends information back to the system such as to record activities, check for data leakage, etc. This could be performed on a previously inactive message or on an already-active message. The active inserts could be dependent or independent of the existing active content. An example may be something as simple as a user feedback option to confirm if a decision (e.g., phishing) made by the system is correct or as part of a business workflow (e.g. share this message with a suggested person).

4 Data Leak Prevention: The system could monitor active content (e.g., forms) for potential data leakage including malicious data leakage (e.g., the active content obtaining access to sensitive data) and accidental data leakage (e.g., a user accidentally attaching a wrong document to a reply or accidentally entering a password in cleartext in a username field or via an autocomplete error). Active messages present new ways for data leakage to occur, e.g., via forms.

5 Extended Accidental Data Leak Prevention (ADLP): The system could extend ADLP protections to active messages and web content.

6 Impersonation: Active message could be used to modify content, e.g., post-delivery such as via external JSON, post user interaction, changing names or words in a message, changing header information, etc.

7 Archive: The system could archive what was shown to a user including different versions of information that were shown and in an archive that allows play-back of actions. In some cases, it may be possible for the system to archive the action sequence directly from a server rather than monitoring the user interaction directly, or in some cases the system could archive interactions by, for example, capturing the web calls and responses or screen images of the user interacting with the message, e.g., as a video or as a snapshot each time the screen changes. The system could compare new content with older (e.g., archived) content and could tell the user that content has changed, e.g., where an indicator is shown if the currently rendered data is different from previous data.

8 Archive Read: If an active message is archived and read even months later, the system can ensure that the same controls/archiving features happen as if the active message was received in real time, as the user could interact with the message months later and the active content could be used as a way for an attacker to try to insert malicious content into an archived message. Such controls could include controls around forwarding of and replying to the active message.

9 Legal\Supervision\Legal Hold: The system could record chain of custody of the active message as well as deal with changeable content (which is discussed in more detail with regard to archiving). In the legal hold process, for example, the chain of custody needs to be established each time the message in question changes hands. For example, if the system collects form data from an active message, then the system could ask each person who reads the message from the point the legal hold is established onward to write their name or other identifying information in the form or in some cases could track each person who reads the message on its own. Thus, for example, the system could add active content to all emails received by anyone subject to the hold to certify whatever is needed. Another use-case for legal holds is not allowing users to see their message bodies while their inbox is under legal hold and rendering the content only after they fill out a form. From a supervision point of view, the system also could record what the recipient was sent, so it may work well for that, too, i.e., solving two problems.

10 Sender Authentication: The system could perform sender authentication (e.g., at the gateway under administrator control) rather than leaving it for the client, e.g., as currently is the case with AMP, which allows the email client to decide who the trusted senders are and hence whether to render the AMP email. The idea here is that this control is pushed back to the SEG or Gateway to allow Administrator control, which could include deciding whether or not end user control is valid. Controlling the distribution and authentication of active message applications will be important. It generally would be better to cut off an unauthorized use before it ever gets to the user. That might involve some interaction between an anti-malware system and an email (e.g., Microsoft) server, and likely also a blacklist of known unauthorized senders and applications.

11 Active content removal: The system could simply remove active content from messages before delivery, thereby changing an active message to a passive message.

12 Active content Defang: The system could execute the active content in an active message, convert the active content to static content, and forward the message with the static content. In doing so, the system could "spoof" being a given recipient of the active message so that the active message content is customized for that recipient as if the recipient had interacted with the active message content themselves. Thus, for example, when the system processes an active message sent to multiple recipients, the system can deliver different static content to different recipients by virtue of different interactions with the active message content. Optionally, the system could provide a user/administrator option to selectively re-enable active content, e.g., selectively re-enable only some active features (e.g., active features that are deemed by the system to be safe) while preserving others (e.g., active features that are deemed by the system to be ongoing security risks). When the recipient is permitted to access an active feature, the system may again execute the active feature on behalf of the recipient and deliver static content, such that the system can, at each interaction, evaluate security risks. For example, a system, method, and computer program product can include a processor coupled to a memory containing instructions executable by the processor to cause the system to receive an email message sent from a sender to a recipient containing active message content; execute the active message content on behalf of the recipient; convert the executed active message content to static content; and forward the email message to the recipient with the active message content replaced by the static content. Executing the active message content on behalf of the recipient may include interacting with the active message content as the recipient so that the active message content is customized for the recipient as if the recipient had interacted with the active message content themselves. If the email message is sent from the sender to a plurality of recipients, then, for each recipient, the system could execute the active message content on behalf of the recipient, convert the executed active message content for recipient to static content for the recipient, and forward the email message to the recipient with the active message content replaced by the static content for the recipient, such that, for example, the system could deliver different static content to different recipients by virtue of different interactions with the active message content. The system could include in the forwarded email message a user option to selectively re-enable at least some of the active content, in which case the system could re-enable only active content deemed by the system to be safe. Upon user interaction with such re-enabled active content by the recipient, the system could re-execute the active message content on behalf of the recipient, convert the re-executed active message content for recipient to static content for the recipient, and deliver the static content associated with the re-executed active message content to the recipient.

13 Active content validation: The system can enforce access controls provided by the active message, for example, applying existing methods to guarantee the provenance of active messages. Additionally or alternatively, the system can scrutinize the content, for example, to limit the actions that can be performed even by active messages from trusted sources. For example, even if x.com is a trusted sender, the system might limit them to actions that are taken only via web calls to the x.com site or a list of other sites authorized to take actions on messages from x.com. Additionally or alternatively, the system could extend this idea to other active elements, e.g., allowing access to a carousel but not to a form.

14 Credential Theft: The system could monitor for and block attempts at credential theft, e.g., filling of forms including auto-fill of forms (e.g., password fields, social security number fields, etc.), keystroke monitoring, etc. The system could determine a credential threat risk for an active message and take action based on the credential threat risk. Generally speaking, credential threat risk involves sending content through the network. The system could monitor the network for unexpected destinations and content and could monitor DNS requests.

15 Scanning: Antispam Engines scan email content on receipt. If that content is dynamic or external, then this scanning may not reveal accurate results, as the content can change post-scanning. An AS engine may have to "run" the message to even get an idea of what would be displayed, but with external content, that alone might not be enough in some cases.

16 Safe Credentials: When the user types into a 'live' message, the system can check for safe credentials (e.g., a "safe" email list) and record the information at every step, both what is displaying in the message and what the user is inputting. In this scenario, the system generally needs to see the changes as shown to the user and constantly refresh the screen as the system performs security/data leakage checks.

17 Banners: Active messages can be used to insert message parts such as contextual real-time warnings or for providing feedback. For example, the active message could include buttons or other controls for feedback. The inventors consider such uses to be potentially patentable and also consider ways to defend against attackers using such mechanisms as being potentially patentable.

18 Email Isolation: When a message contains active message (e.g., AMP or AM) content, then the system can open the message in a virtual or otherwise protected environment (e.g., sandboxing), record what gets displayed, and then save the original message and the recorded session to an archive or as part of a security or data leakage check. The system can identify contingent information in the message, identify content directed at certain recipients, or trace the chain of custody on such messages (e.g., in the context of archiving and security).

19 SWG: A secure web gateway proxy or specialized active message proxy could be used to perform archiving or security protection of active message content but needs to be able to associate the archived content with the message, which could be done, for example, using a predictive hash store (e.g., hash the URL, store the content under that hash, maintain the versions).

20 Passwords: Active messages could be used to send passwords to people over HTTP. For example, many existing secure messaging systems send a message and also send a second message with a password for reading the first message. Active messages may be able to avoid this second message, e.g., by using HTTP to directly provide the password to the user (possibly involving an additional security step).

21 Confirm Validity: The system could confirm that the sender of an active message still confirms validity of the message, e.g., that the message has not been canceled or recalled. This is a way to make sure that the contents of the message are not out of date or have not been determined by the alleged sender to have been fraudulent.

22 Enforce biometric identity check: Active messages could allow actions only via a biometric identity check such as a retina scan. That is, the message itself could enforce a biometric identity check before revealing its contents or letting the user interact with it. See item 48 below for further discussion.

23 User consistency: The system could match the content of the active message with the content and interest of what the system already knows about the user's interests. If the active content is completely different (e.g., insurance vs. cooking), then the system could flag the message as a potentially higher risk.

24 Browsing consistency: The system could mine the browsing history/content (e.g., with a plugin or Proxy) and compare that to the time and content/sources of active messages. This can be used as a risk score as well.

25 Managing secure content: The system could manage secure content for legitimate active message senders, including rewriting links, securing storage, scanning active messages for functionality that is only supposed to be in the non-email part of an active message, etc.

26A An active message can be used to allow the recipient to respond to a question completely within the body of the message rather than via a link to a web site, e.g., an active message that provides a list of questionable messages on hold which the recipient can choose to release/block/permit completely within the body of the message rather than via a link to a web site. Among other things, such an active message could make the list entirely dynamic and reactive to the user's input and also to external changes, e.g., dynamically remove processed emails from the list and dynamically add new emails to the list even after the email has been sent. Such an active message also could have more advanced user interface controls, e.g., using click buttons rather than links for the user to select options such as release/block/permit, including a "release all" button to allow the user to release all of the listed message, allowing for selective actions in the body of the message per item, etc.

26B An active message could be used to "wrap" a suspicious message with questions and explanations to help make sure the user is thinking about the possibility that the message might not be what it seems, as opposed to a more traditional approach in which a suspicious message might have a warning message prepended to it before delivery.

27 An active message could be used as a sort of "CAPTCHA" mechanism. For example, the system could allow a user to set up the messaging account such that when a message is received from an unknown sender, the system could produce an automatic reply delivered to the sender as an active message that requires the sender to prove it is not a robot.

28/29 AMP comes with a proxy (see, for example, https://developers.google.com/gmail/ampemail/security-requirements and https://amp.dev/documentation/guides-and-tutorials/contribute/email-viewer/) and a cache (see, for example, https://amp.dev/documentation/guides-and-tutorials/learn/amp-caches-and-cors/how_amp_pages_are_cached/and https://github.com/ampproject/amphtml/blob/master/spec/amp-cache-guidelines.md). The proxy is purportedly for user privacy. It is unclear if it is always on or controlled (via allow-xhr-interception) by the sender, although the latter article appears to suggest that it is optional. Either way, exemplary embodiments can take actions such as enforcing the use of a proxy or running a separate proxy, removing options, or using url rewrites to avoid tracking (e.g., by Google or anyone else). The cache can be applied to active emails and other types of active message, and operations such as altering or defanging messages can be done in the cache.

30 The system could provide protection for cookie activity within an active message, e.g., third-party cookies, cross-site cookies, etc.

31 The system could manage age-restricted or other protected content/actions delivered via active message (e.g., NSFW content/actions such as gambling or social media).

32 Active content has the potential of accessing virtually any local resources (e.g., files, emails, calendars, contacts, networks, dynamic notifications, camera, microphone, etc.) and perform virtually any type of action (e.g., delete, edit, drag and drop, download, send email, delete email, etc.). The system could control access to local resources and actions.

33 The system could block advertisements delivered via active message.

34 They system could protect/control whether an active message can invoke auto-fill of form fields.

35 The system could perform active message processing at a firewall or proxy server rather than closer to the recipient such as at a secure email gateway. Many of the types of security controls applicable to webpages and firewalls can be applied to active messages.

36 Active messages can be used with other message types, e.g., SMS, IM, Slack, Chat, etc.

37 Generally speaking, executable content beyond active message executable content should never be present anywhere in a message in clear or obfuscated form. The system could check for such executable content or links to such executable content and take action such as remove or rewrite the content, block access to the executable content, run the executable content as a proxy, etc.

38 The system could rewrite and check links received from external requests.

39 The system can track all interactions (e.g., user interactions, the amount of time the reader engages with a message or its parts, etc.) back and forth initiated from the message (e.g., via external downloads or redirections) back to the message. Then, if something inappropriate is detected (e., malware, data leakage, etc.), the system can track back to the message and sender and take action, e.g., block, remediate, etc. Tracing back and forth all user interactions so the system can link what was clicked, downloaded, by which email, where it redirected, etc. In some respects, this can be viewed as a sort of secure web gateway inside of an active message. Realtime knowledge of a compromised user.

40 A secure web gateway could be implemented inside an email client or plugin such as to solve some of the issues described immediately above.

41 Productivity monitoring. Traditional email is static, i.e., the sender does not know when the user reads it or how the user interacts with it (although an external image can be used to detect that a message was read). With active messages, it becomes easier for the sender to detect the act of reading and also the user interactions with the message. Thus, for example, active messages could be used to detect interactions with the message in the context of productivity monitoring. The inventors consider such use to be potentially patentable, and also consider ways to prevent such monitoring discussed herein to be potentially patentable.

42 The message client could perform process isolation, e.g., by rendering each message in a separate process such as to prevent one message from influencing the content of another message. This could prevent, for example, problems in AMP that might occur due to the fact that the AMP code is generally written in Javascript and there are multiple variant Javascript interpreters, some of which might be unreliable or allow information to leak from one message execution environment to another. The system could not only isolate the process in which the active message runs but also could force it to run with a preferred implementation of Javascript. While this example is specific to AMP and Javascript, the same types of issues could exist in any active message language, as the version of the language interpreter may vary from site to site, and the active message is run on the client's machine. Thus, this solution could be applied more generally to any active message environment.

43 The system could monitor and block attempted cache poisoning attacks through active content of an active message or could insert cache poisoning attacks into an active message.

44 User interfaces to build AMP messages in local client, e.g., Carousel for multiple images.

45 The system could restrict active message access to local network resources, e.g., to prevent an active message from posting data to an internal web server as part of an attack.

46 The system could perform special handling for multi-recipient messages. Since each recipient could receive the same message but different content when viewed, the system could perform checks to confirm that all recipients receive the same content or generate a notification if different recipients receive different content. For example, imagine if a draft contract was sent to multiple reviewers and one of the recipients receives a slightly different version.

47 Active messages could be used for interactive marketing videos, e.g., serving different content based on user responses or actions.

48 Authentication could be embedded within an active message, e.g., a message that, when a user tries to read it, forces some kind of authentication such as using iris scan or other biometric authentication, including "soft biometrics" such as using properties of a person's face or responses to prompts in place of "hard biometrics" such as an iris scan. For example, the active content could prompt the user to move in one direction or another depending on cues that are given in real time, e.g., move your head to the left if there is a bus in the picture, move your head to the right if there is a stoplight in the picture, nod your head up and down, wave with your right hand, etc. Generally speaking, this would require a 3-D model of a face (not just a photo) and would require understanding the picture and the request. As another example, the active content could look at movement patterns in response to the cues (e.g., smooth movements of particular sorts) and other factors that would be easy for people but more challenging for fakers, such as, for example, eye movements.

49 Security: The system could rewrite links to external content and then proxy the content real-time. The system could "fix" the content via caching or archive the different presented views each time. In a supervision context, the system could show all views to the supervisor that the person has already seen and alert them to new content or mandate that fixed content. The following is an example of such inbound processing:

Eu-protect.mimecast.com gets registered as an authenticated AMP sender.

The system rewrites the sender email address to be within that domain.

The system re-writes the active message payload to be within that domain.

The system forwards the revised message.

The user receives the revised message and because it is valid (e.g., by virtue of the rewritten sender email address) and security compliant (e.g., by virtue of the rewritten active message payload) the receiver system renders it.

The active message content is requested via the protected domain and is proxied back to the user.

If the user replies, the system can unwrite the email address and payload (as appropriate).

50 The concepts of items 49 above but for outbound, which would work in essentially the same way.

51 Techniques for capturing/archiving web pages such as for eDiscovery can be used to capturing/archiving active message content.

52 The idea of alternative versions of a message is an old one—actually, it was invented as part of the original MIME spec. But the MIME multipart/alternative is limited in that it forces the sender to include all versions of a message and makes the user's mail reader figure out which one to present. Instead, the decision to show different versions could be made by the system at run time, for any of a variety of reasons, and the various versions would not have to all be included in the message. For example, the selected version could be retrieved from external content or implemented by the active content at run-time, e.g., a program to adjust images to compensate for a type of color blindness of the user, which could be actively solicited from the user at run-time (e.g., "Which type of color blindness do you want me to correct this graph for?") or derived from other information (e.g., a user profile or learned from past user behavior).

53 Active Messages for Message Threads: Active messages could be used for message threads (e.g., chats) in which users can have a chat in the message without the need to send new messages (e.g., allowing email messages to be accompanied by an ongoing chat conversation). This usage case can raise a number of opportunities and issues both for positive uses and nefarious uses. For example, the same mechanism allowing users to interact in real-time through the active message also may allow malicious actors to phish in real-time interactively. Also, such uses of active messages raises the question of how a user would know that someone replied and that the message has therefore been updated. Generally speaking, when a user reads a message, the message is marked as being "read." In the case of active messages, however, the system could provide an indication that a reply has been received, e.g., by resetting the message back to unread or marking it with a new status (e.g., updated). Additionally or alternatively, the system could do something like show the chat next to the core message and give the user a clear and meaningful choice between replying to the message and continuing the chat. This message thread mechanism could allow for various ancillary functions, e.g., allowing users to exchange/upload files and enforce time limitations on access to the message content or files (e.g., could remove from the dynamic content).

54 Dynamic Stationery: Active messages could be used to implement forms of dynamic stationery, e.g., where the message stays the same but the stationery is dynamic updated.

55 Dynamic Message Recall/Revision: Active messages could be used to create a wrapper around a message, e.g., to allow for recalling a message after being sent or even to allow to revising a message after being sent (e.g., to correct a typographical error, change contact information in a message signature, etc.). For but one example, if the original content was external and the message includes a wrapper that by default fetched and rendered it, the result would be a form of secure message system that looks like normal a normal message (e.g., email) but has all the features of secure messaging.

56 Further to item 55, these concepts can be applied more broadly than just message recall. For example, some messages are so sensitive that they shouldn't be stored on Exchange\O365. An active message wrapper could achieve this. Recall, expiry, cut and paste, disable, image version, and other operations all become possible. The same applies to attachments, e.g., strip and link functionality could be done via active messages with the attachment now being external.

57 The system also could provide a status field on the sender side, e.g., Sent/Delivered/Seen/Seen and Downloaded files, etc.

58 Active messages could be used to add an attachment after sending the message or change an attachment after sending a message.

59 If attachments are added to the active message part, the system could deliver the message first while the scanning of the attachments are done in the background, sandbox, AV, etc., giving the impression that the email is faster. This could be done, for example, by setting policies to notify. The system also could deliver the message while the system evaluates if it needs to send notification. This can also have significant impact in redaction and remediation, e.g., the system could change the messages, so different types of remediation are now possible.

60 Active messages could be used (e.g., by an email tracking system) to deliver different messages depending on the IP of the person reading the email, e.g., to conform with Data Protection Regulations like GDPR or CCPA.

61 Active messages could be used to digitally sign documents.

62 The following is another example of active message usage: Imagine there is a conference/event that our customers are invited to. We send them an invite with the link in, except that the link/text is smart and time sensitive. As the time approaches, it simply says "30 minutes to conference start . . . " (decrementing as time goes). At launch time, it becomes an active link. Afterwards it becomes a link to the recorded session. This could also be transferred to the whole calendar experience, e.g., smart calendars that adjust to events. In this way, there would be no need to send email; rather, just to send the link of the recording. And no need to send email back to accept the meeting invite, it all could be done in the background, even updating exchange if needed. Thus, the general idea of embedding intelligence in a calendar object, e.g., allowing the user to go back to old meetings on the user's calendar and just click for a replay if it's still available.

63 Active messages could be used for providing client extensions such as to allow the user to add notes to an email, e.g., in lieu of responding or forwarding the email to themselves to add notes. Active messages can provide a more elegant way of doing this. Notes could then be available to just the person adding them or to all the recipients and sender of the message.

64 Although exemplary embodiments describe active content in the context of active email messages, it should be noted that it is contemplated that active content can arrive via virtually any mechanism (e.g., email messages, text messages, instant messages, voicemail messages, social network communications, video chats, advertisements, web content/messages, stores, etc.). The concepts described herein for using and dealing with active messages can be applied to any such delivery mechanisms.

65 Email client search results could be improved by converting attachments to readable form (e.g., using OCR) and including such converted content inside the AMP message, even if not displayed to the user. This would improve the user experience.

66 Active content could be protected, e.g., by password, biometric (e.g., fingerprint), or other mechanism, such that the user could be prompted for credentials (e.g., password), identification, or authentication to access the content in an AMP message. Thus, for example, AMP could be used as a wrapper that would prompt the user for a password or other credential.

67 Active content could be used for redacting sensitive information from a message such as based on the identity of the user who is seeing the message and/or a level of access associated with the user. The redacted content could be un-redacted, e.g., with a biometrics scan or other credential, identify, or authentication.

68 Systems (e.g., Mimecast Targeted Threat Protection—Attachment Protection) can be used to strip attachments from inbound messages that could potentially contain malicious code (e.g. PDF, Microsoft Office files) and to replace them with a clean (e.g., transcribed) version. Users can be given instant access to these clean attachments but can request access to the original files, e.g., by clicking a link in the notification. When an original attachment is requested, a detailed security analysis is performed on the file before it is provided to the user. Active content could be used to control and/or perform such functionality, e.g., when the user requests the original file back, the active content could just download the file.

69 Active messages could be used to allow for collaborative drafting of a message, e.g., if two people are writing an email, they could use dynamic content to write it together and then send it. Such collaborative writing also could benefit from sharing of documents other than text (e.g., images+documents+etc.) such that when another person opens an active message, that person can see the media that were added by other collaborating users. The media could be stored server side (which generally would be easier to manage and synchronize), or the media could be added to the active message such that the active message grows and gets forwarded each time someone adds something.

70 Active message could include a mechanism for the user to request related information, e.g., a "Related Messages" mechanism (e.g., link) that would cause related messages to be retrieved from an archive and presented to the user such as in a list or table and/or a "Related Attachments" mechanism (e.g., link) that would cause related attachments to be retrieved and presented to the user such as in a list or table.

71 Active messages could be used to add and/or remove recipients from a message. For example, the active message could present a form or other input mechanism through which the user can specify recipients to be added and/or removed, and the system could send the message thread to any added recipients and could recall the message from any removed recipients. Such recall could be done virtually through active content, e.g., deleting or otherwise preventing the prior recipient from continuing to access the message content. The system could update the email system (e.g., Exchange) to reflect any changes in recipients. Active messages could provide other controls, e.g., message recall, message expiration, disabling of cutting and pasting, image version control, "strip and link" functionality to replace attachments or other content with links (e.g., for handling large files), and other controls can be provided by active content.

72 Active messages could be used to simplify a device enrollment process, e.g., device enrollment could be controlled or performed by active content that could register the device and optionally link the user with the registered device.

73 Active messages could include an expiration mechanism that, for example, could be encoded in the active message or its state or applied dynamically through the system (e.g., loaded from a server).

74 Some messages may be so sensitive that an administrator or organization does not want them to be stored, e.g., in Exchange/O365. An active message wrapper could be used to prevent message storage of sensitive messages.

75 Active messages could include voting controls and also could display the results of votes. Thus, for example, active messages could be used for collaboration/consensus building, decision-making, polling, questionnaires, and other voting or feedback.

76 Active messages could be used to provide content control, e.g., checking a message's "emotional content" (e.g., sad, confident, angry, etc.) prior to the user sending the message, checking grammar and making grammatical changes or suggestions, checking punctuation and making punctuation changes or suggestions, suggesting alternate wording (e.g., real-time thesaurus), suggesting additional content (e.g., if writing about a particular topic, the active content could find relevant online content to support or embellish), scoring or otherwise predicting how much "impact" the message might have in view of other messages such as in an archive (where "impact" can be defined in various ways, e.g., determining whether or not the message is responsive, determining whether the message is likely to be flagged or filtered such as by containing dangerous words or by being in violation of community guidelines of an organization, etc.

77 Active messages could take advantage of AMP JavaScript implementation links. The system could substitute such links (either inline, via a proxy, or via the client) with implementations focused on other things rather than simply running the AMP. For example, there could be AMP implementations focused on Security or Archiving or adding richer content, e.g., acting similar to an extension.

78 Active messages could be used to allow faster delivery when long file scans are required, e.g., the message can be sent and later the active content can retrieve the file once scanning is complete, e.g., either automatically or when the user tries to access the file such as through a link that was inserted in place of the original file.

79 Active messages can be used to implement a form of "smart links" in which all links in a message are associated with the message, e.g., allowing a service to tie an Active Message HTTP request back to the message itself such as for archiving or data leak prevention purposes.

80 AMP messages have the option to expire after 30 days. Exemplary embodiments could allow this 30 day expiration to be overridden, e.g., with a longer or shorter timeframe. For example, in certain archiving situations, expiration might be undesirable or impermissible and active messages could be used to enforce such requirements.

81 Active messages could be used to save space in message threads/replies. For example, the previous message(s) could be a dynamic field that the user would get when the message is presented, and then the system could show the previous one by default and just load the others when the user click a button. In this way, each email inside a huge thread like this one would be smaller.

82 Active message could be signed with the same certificate as the one used by the server allows the client to both validate that the message has not been tampered with (e.g., no code injection) and that the active message is talking to the correct server.

83 In order to provide data leak prevention for email, the system could include a secure web gateway (SWG) to inspect form submissions. The SEG and SWG will need to co-operate to do this.

84 Link redirection doesn't work with AMP. According to https://developers.google.com/gmail/ampemail/security-requirements, "XHR URLs mustn't use HTTP redirection. Requests that return a status code from the redirection class (3XX range) such as 302 Found or 308 Permanent Redirect fail, resulting in a browser console warning message." This means an inline proxy would be required in order to perform link redirection.

85 The system could take a normal message, identify sensitive\redactable content, move that content to an external resource, make the message "active" including a reference to the resource, and then allow access to the content via the active message based on predetermined criteria/policies. The content could be changed at the time of access to bring it current.

86 Active messages could be used to control the message language. For example, if a sender uses multiple languages (e.g., for EU regulations), there could be a button in an active message that changes the recipient's preferred language. Instead of just affecting the current message, it could affect all messages received from that send in the past, present, and future. Past\Present would only be affected if the language content was active\external.

87 Active messages could be used to automatically change the message content after a designated amount of time. For example, active messages that contain private or sensitive information could automatically convert themselves into harmless messages after a designated amount of time—presumably longer than needed by the user but shorter than the time horizon for completely destroying/discarding messages (e.g., messages relating to a potential lawsuit could be converted after the statute of limitations expires). In order to address such automatically changing messages, the system could archive prior versions of the message and any related content or could analyze archived active messages to flag any that deliberately changed based on a date.

88 Active messages can be sent in bulk (e.g., newsletters) and can be personalized on the client side through user specific data fetched form a server, e.g., after the client identifies itself to the server. This could be done, for example, through a "login" link in the active message or by giving the active message the ability to automatically send the recipient email address as an ID to the server with network requests that the active message might make. There generally would need to be some security in place to prevent leaking email addresses that were not explicitly part of the email header. Among other things, sending the active message in bulk can eliminate the need for server-side personalization and also can allow for more efficient personalization by sending content and data (the personal information) separately or loading them at render time, which also allows for changing the personalization and only incurs cost when the message is read.

89 Active messages could include a "like" button or other feedback mechanism. The system could use the feedback, for example, to improve search results, advertisement selection, or other activities, e.g., using knowledge graphs. The system also could transform non-active emails into active emails to put a "like" button onto previously non-active incoming message or those selected for some purpose (e.g., by topic, randomly, by sender, etc.) to get a better idea of which messages are wanted. Similarly, the system could embed "report spam" buttons in messages to facilitate spam reporting even if the user interface does not have such a mechanism or does not send reports where they need to go for supporting this feedback mechanism (e.g., an email vendor might have its own spam reporting mechanism but this active message based mechanism could send reports to a different system).

90 Active messages could be used to send a snippet of a webpage as part of the email message body and then that snippet could be updated as the web page changes. This type of mechanism also could be used to update topical/timely messages with current information. For example, a message about a current outage or security event could be prefaced with an update on the current situation. More generally, any message about a recognized topic could be augmented in this way. Thus, for example, a message could be sent reporting a dangerous condition (e.g., an approaching storm, an active shooter incident, a missing child or pet, a fire or other building issue, etc.) but that message could be turned into an active message that provides updated information, e.g., by the time a particular user reads the message, the dangerous condition might be over and this could be reflected in the content provided to the user.

91 Eye tracking functionality could be embedded in active messages, e.g., turning on a device camera and tracking the user while reading the message such as for analyzing the psychology (e.g., cognitive state or reaction) of the reader, for analyzing the reading level of the person reading the message, for tracking where the person focuses and/or how long the person focuses (e.g., on a particular word or phrase or picture), for automatically scrolling or turning the page as the person gets to the bottom of the previous page, etc. Focus analysis could be used, for example, to provide advertisements on related products or services, to provide additional information on a topic of apparent interest to the reader, to provide market research information (e.g., to analyze aspects of the contents that capture's the reader's attention such as, for example, color, font, pictures, placement, etc.). Reading level analysis could be used to present an alternate version of the content based on the reading level.

92 Using active message technology in user awareness training, for example, highlighting the part(s) of an awareness training email that would be obvious or potential security (e.g., phishing) risks, where such highlighting could be dynamic (e.g., if the user clicks on a link, a message could be displayed to the user as to why they should not have clicked on the link, and even such warnings could be dynamic and/or personalized through active messaging (e.g., actions could be run through a remote server that provides personalized feedback such as that the particular user tends to fall for particular types of phishing attempts or should be suspicious of emails from particular types of senders). Also, another example would be wrapping a real phishing email in an active message to provide for interactive training while protecting the system from the phishing attack such as by preventing the user from clicking on a link or opening an attachment or by allowing the user to click on a link or attachment but preventing the system from acting on such link selection (e.g., preventing the link from executing or preventing the attachment from opening) and instead displaying information as to why the user should not have clicked on the link or attachment.

93 Dynamic messages that measure cognitive load. In combination with monitoring biometrics (e.g., eye movements) via an active message, exemplary embodiments can use biometric measurements to assess a person's cognitive load during interaction with the active message, e.g., to assess a person's cognitive load during a phishing test to determine if the cognitive load is a factor in the person clicking on the phishing email (generally speaking, a phishing test is a test message sent to a person to see if the person will click on a link in the message or take other action with the message that would be problematic if the test message had been a real phishing message). According to Wikipedia (https://en.wikipedia.org/wiki/Cognitive_load), in cognitive psychology, cognitive load refers to the used amount of working memory resources. There are three types of cognitive load: intrinsic cognitive load is the effort associated with a specific topic; extraneous cognitive load refers to the way information or tasks are presented to a learner; and germane cognitive load refers to the work put into creating a permanent store of knowledge (a schema). Perceived mental effort, which is indicative of cognitive load, can be measured through task-involved pupillary response, e.g., by monitoring pupil size and changes using the computer webcam. According to Wikipedia (https://en.wikipedia.org/wiki/Task-invoked_pupillary_response), task-invoked pupillary response is a reliable and sensitive measurement of cognitive load that is directly related to working memory. All of the measurements needed to assess cognitive load should be present through the webcam.

94 Collaborative email replies. Exemplary embodiments can utilize active messaging to filter out emails that have already been actioned by others internally or to sort messages according to an importance-based scoring system, for example, based on whether or not other people in the same organization (or team) had received a similar email (either because the email was sent to multiple users, or by matching similarities in the text as it could have been sent again in response to an out of office), whether or not the user or other person had replied to the message or taken other actions taken in response to the message, whether or not the message was calling for an action, whether the message referenced a data (e.g., a deadline for a reply or other action), whether or not an update to the message was sent to a large internal mailing list, or whether or not the message sender matches a contact in a CRM system (e.g., a client, customer, etc.). For example, such processing could be applied to inboxes such as when a user returns from holiday, e.g., to sort messages or even to mark some messages as being read (or a new category between read and unread). Among other things, such processing would solve the common issue of people replying mid-chain when their reply is no longer relevant or fails to take into account subsequent conversation.

95 Email as a standalone web page. Similar to the concept of serverless web-applications, emails including active message content can be made to completely work as a standalone web page such as, for example, being able to search for products or read the details of a product and purchase it all inside of the email.

96 Embedded tracking system for customer support and other workflow processes. The idea is to update a customer support email so that, whenever you went back to it, it would show you the up-to-the-moment status in the processing/workflow.

97 Email recipient notifications. The system can be configured (e.g., through user configuration) to automatically respond to incoming emails with status information, even before the user had read the emails (e.g., the active message can be made to run at receipt time), such as to set expectations in terms of response times, e.g., a notification that the user is offline (optionally including the amount of time the user has been offline), a notification that the user is behind on their emails, a notification that the sender should expect a delay in response from the user (optionally including an estimate of the amount of delay to expect), a notification of the typical response time of the user, etc. Additionally or alternatively, the system can automatically send a notification to the user (e.g., via text message) if an important email is received, e.g., an email from a manager or customer, or an email containing content determined by the system to be important such as using artificial intelligence analysis.

98 As an extension to, for example, #53 above, a chatbot can be embedded in the same dynamic message so that the user can talk to a support representative or system in real time right from within an old email message, such as for customer support.

99 Tracking access to active message content. The system can track access to content such as tracking who has read a particular email or accessed email content such as a link via active messaging and therefore the system can track, e.g., who has accessed the content and details of such access (e.g., when the access took place, how long the person interacted with the content, how the person interacted with the content, what active content was presented to the person, etc.), and present this information to the user whenever they open the dynamic email such as in the sent folder. Such tracking also could be used, for example, to provide read receipts including read receipts for just a specific person when sending an email to a bunch of people.

100 Dynamic stationery/advertising. Active messages can include dynamic stationery or advertising that can be dynamically updated over time, for example, as prior versions become obsolete or parameters of an advertising campaign change. Additionally, stationery or advertising could change based on recipient such as, for example, and without limitation, industry of the recipient, job title of the recipient, time zone of the recipient, time when the recipient opens the email, etc. Without limitation, some ways that such dynamic stationery or advertising can be used include:

Dynamic email signatures, e.g., to dynamically update such things as out-of-office status of the sender, provide an alternative contact while the sender is out-of-office or if the sender is no longer at the company, add a contact to an email (e.g., add a contact URL to the email, or directly incorporate the latest contact information which could change dynamically based on the status of the recipient/sender), update sender information (e.g., add or change information such as the sender's name for example if the person got married or divorced, job title, address, contact information, etc.), etc.

Rewrite journal emails with active content as they are received. For example, if a customer routes internal email through the security system 10 then the security system 10 or alternatively the email client itself could insert active message content.

Change internal stationery to alert the recipient to not engage with the sender, e.g., if the sender has been "walled off" from contact since the recipient received the original email.

If a company has multiple stationery or advertisements available, the system could randomly show one of the options and then could track which one has more interactions and leads to sales, and based on that it could show the one that has more success in both future email and, with dynamic email, on emails that were already sent as well.

Replace stationery or advertising dynamically, for example, if the sender activated the wrong stationery or advertising with the original dynamic email.

101 Active messages for time-sensitive activities. Active messages can be used to provide users with access to time-sensitive activities such as online betting, trading, auction, etc. For example, a user can get an email from an online casino with the details of an event and the odds. The user can insert in the form how much they want to bet and make the bet directly from the email. Each time the email is accessed, it can present the status of the bet and the user's account balance. There are many types of bets. In some cases, the user can insert new odds, back up one or more results. Making placing bets faster can would have a very significant impact on betting websites. More generally, dynamic email can accelerate user interaction compared to traditional email.

102 Viral recruiting or search with bounties. Dynamic messages could create a focused distributed search to find candidates for a role (employee, expert witness, etc.) while tracking a plurality of people who might deserve a recruiting bounty. For example, a campaign could set up a recruitment bounty, e.g., "$5K for someone to fill role X," and then send dynamic messages to a first group of people asking if they know anyone, or know anyone who might know someone, who would be good for the role. If they name someone who might know someone, then the process would be repeated by sending the same messages to such additional people. When the role is filled by a particular candidate, if that candidate had been found through this process, then the system can determine who was involved with finding the candidate, e.g., using a shortest path search through the history of messages leading to that candidate. The bounty then could be divided between those who were involved. If there is more than one shortest path, then the bounty could be divided between all who were involved across the multiple paths. Among other things, this mechanism would allow an employer to combine the motivating power of a recruitment bounty with the use of dynamic messages to find a candidate through a series of experts recommending other experts or the person to hire.

103 Convert static content to active content. Similar to converting active content to static content before forward a message to the user, the system could convert static content to active content before forwarding a message to the user. Among other things, this could be useful in security applications where the change to active content could allow the system to push updates to the user via the active content rather than using images as is currently done. For example, a system, method, and computer program product can include a processor coupled to a memory containing instructions executable by the processor to cause the system to receive an email message sent from a sender to a recipient containing static message content; convert the static message content to active content; and forward the email message to the recipient with the static message content replaced by the active content. The system could deliver different active content to different recipients. The system also could use the active content to push updates or information to the user such as security information about the message or elements of the message.

It should be noted that the inventors contemplate any of the above used alone or in any combination or combinations.

It should be noted references to "the system" above are meant to refer to the appropriate system for the context in which it is described, e.g., an email system, an archiving system, a security system, a secure email gateway, a secure web gateway, etc. In some of the numbered items discussed above, "the system" might refer to the execution of an actual active message within the user environment.

Various embodiments of the invention may be implemented at least in part in any conventional computer programming language. For example, some embodiments may be implemented in a procedural programming language (e.g., "C"), or in an object-oriented programming language (e.g., "C++"). Other embodiments of the invention may be implemented as a pre-configured, stand-alone hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., email systems, archive systems, security systems, a secure email gateway, a secure web gateway, a user environment in which an active message is executed, etc.) are necessarily non-conventional because, absent special programming or configuration, the conventional components do not inherently perform the described non-conventional functions.

The activities described and claimed herein provide technological solutions to problems that arise squarely in the realm of technology. These solutions as a whole are not well-understood, routine, or conventional and in any case provide practical applications that transform and improve computers and computer routing systems.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Although the above discussion discloses various exemplary embodiments of the invention, it should be apparent that those skilled in the art can make various modifications that will achieve some of the advantages of the invention without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A system for active message email security, the system comprising:
   a processor coupled to a memory containing instructions executable by the processor to cause the system to:
   receive an email message sent from a sender to a recipient containing active message content;
   execute the active message content on behalf of the recipient;
   convert the executed active message content to static content; and
   forward the email message to the recipient with the active message content replaced by the static content, wherein executing the active message content on behalf of the recipient comprises interacting with the active message content as the recipient so that the active message content is customized for the recipient as if the recipient had interacted with the active message content themselves.

2. The system according to claim 1, wherein, if the email message is sent from the sender to a plurality of recipients, then, for each recipient, the system executes the active message content on behalf of the recipient, converts the executed active message content for recipient to static content for the recipient, and forwards the email message to the recipient with the active message content replaced by the static content for the recipient.

3. The system according to claim 2, wherein the system delivers different static content to different recipients by virtue of different interactions with the active message content.

4. The system of claim 2, wherein the system generates a notification if different recipients receive different static content.

5. A system for active message email security, the system comprising:
   a processor coupled to a memory containing instructions executable by the processor to cause the system to:
   receive an email message sent from a sender to a recipient containing active message content;
   execute the active message content on behalf of the recipient;
   convert the executed active message content to first static content; and
   forward the email message to the recipient with the active message content replaced by the first static content, wherein the system includes in the forwarded email message a user option to selectively re-enable at least some of the active content, wherein the system re-enables only active content deemed by the system to be safe, and wherein upon interaction with re-enabled active content by the recipient, the system re-executes the active message content on behalf of the recipient, converts the re-executed active message content for recipient to second static content for the recipient, and delivers the second static content associated with the re-executed active message content to the recipient.

6. The system of claim 5, wherein the system compares the second static content to the first static content and notifies the recipient if the content has changed.

7. A computer-implemented method for active message email security by a system comprising a processor coupled to a non-transitory memory containing instructions executable by the processor to cause the system to:
receive an email message sent from a sender to a recipient containing active message content;
execute the active message content on behalf of the recipient;
convert the executed active message content to static content; and
forward the email message to the recipient with the active message content replaced by the static content, wherein executing the active message content on behalf of the recipient comprises interacting with the active message content as the recipient so that the active message content is customized for the recipient as if the recipient had interacted with the active message content themselves.

8. The method according to claim 7, wherein, if the email message is sent from the sender to a plurality of recipients, then, for each recipient, the system executes the active message content on behalf of the recipient, converts the executed active message content for recipient to static content for the recipient, and forwards the email message to the recipient with the active message content replaced by the static content for the recipient.

9. The method according to claim 8, wherein the system delivers different static content to different recipients by virtue of different interactions with the active message content.

10. The method of claim 8, wherein the system generates a notification if different recipients receive different static content.

11. A computer-implemented method for active message email security by a system comprising a processor coupled to a non-transitory memory containing instructions executable by the processor to cause the system to:
receive an email message sent from a sender to a recipient containing active message content;
execute the active message content on behalf of the recipient;
convert the executed active message content to first static content; and
forward the email message to the recipient with the active message content replaced by the first static content, wherein the system includes in the forwarded email message a user option to selectively re-enable at least some of the active content, wherein the system re-enables only active content deemed by the system to be safe, and wherein upon interaction with re-enabled active content by the recipient, the system re-executes the active message content on behalf of the recipient, converts the re-executed active message content for recipient to second static content for the recipient, and delivers the second static content associated with the re-executed active message content to the recipient.

12. The method of claim 11, wherein the system compares the second static content to the first static content and notifies the recipient if the content has changed.

13. A computer program product comprising a tangible, non-transitory computer readable medium having stored thereon instructions, which, when run on a computer system, causes the computer system to:
receive an email message sent from a sender to a recipient containing active message content;
execute the active message content on behalf of the recipient;
convert the executed active message content to static content; and
forward the email message to the recipient with the active message content replaced by the static content, wherein executing the active message content on behalf of the recipient comprises interacting with the active message content as the recipient so that the active message content is customized for the recipient as if the recipient had interacted with the active message content themselves.

14. The computer program product according to claim 13, wherein, if the email message is sent from the sender to a plurality of recipients, then, for each recipient, the system executes the active message content on behalf of the recipient, converts the executed active message content for recipient to static content for the recipient, and forwards the email message to the recipient with the active message content replaced by the static content for the recipient.

15. The computer program product according to claim 14, wherein the system delivers different static content to different recipients by virtue of different interactions with the active message content.

16. The computer program product of claim 14, wherein the system generates a notification if different recipients receive different static content.

17. A computer program product comprising a tangible, non-transitory computer readable medium having stored thereon instructions, which, when run on a computer system, causes the computer system to:
receive an email message sent from a sender to a recipient containing active message content;
execute the active message content on behalf of the recipient;
convert the executed active message content to first static content; and
forward the email message to the recipient with the active message content replaced by the first static content, wherein the system includes in the forwarded email message a user option to selectively re-enable at least some of the active content, wherein the system re-enables only active content deemed by the system to be safe, and wherein upon interaction with re-enabled active content by the recipient, the system re-executes the active message content on behalf of the recipient, converts the re-executed active message content for recipient to second static content for the recipient, and delivers the second static content associated with the re-executed active message content to the recipient.

18. The computer program product of claim 17, wherein the system compares the second static content to the first static content and notifies the recipient if the content has changed.

* * * * *